UNITED STATES PATENT OFFICE.

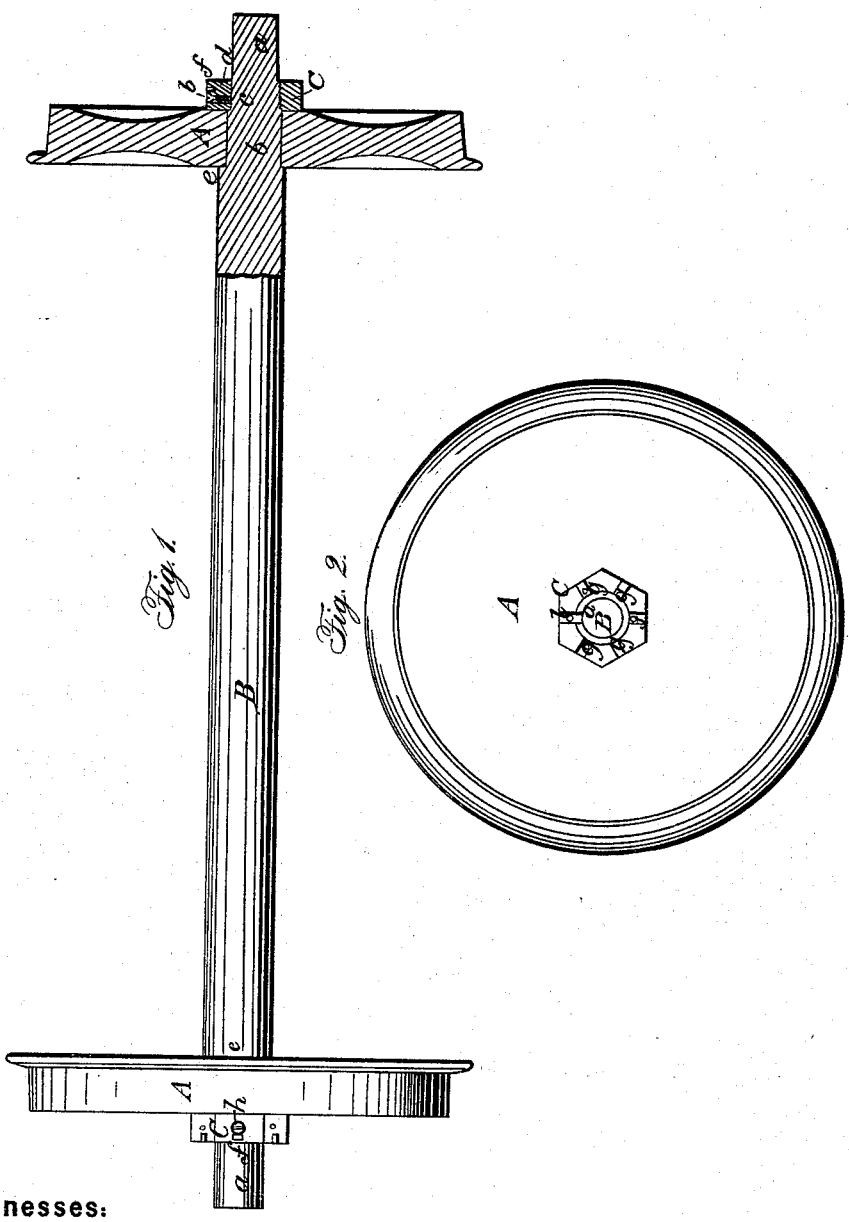

R. S. TORREY, OF BANGOR, MAINE.

IMPROVEMENT IN MODE OF ATTACHING CAR-WHEELS TO AXLES.

Specification forming part of Letters Patent No. 43,440, dated July 5, 1864.

*To all whom it may concern:*

Be it known that I, R. S. TORREY, of Bangor, in the county of Penobscot and State of Maine, have invented a new and Improved Method of Attaching Car-Wheels to their Axles; and I do hereby declare that the following is a full and exact description thereof, reference being had to the accompanying drawings, making part of this specification.

Figure 1 is a view of a car-axle, showing one end and its wheel in elevation, and the other end and its wheel in section, so as to fully show my improvement; Fig. 2, an end view of the same.

Like letters designate corresponding parts in both figures.

The car-wheels A A are placed upon a portion, $b$, of the axle B, a little smaller in diameter than the main portion of the axle, so as to cause the wheels to abut against shoulders $e\ e$. Between the wheels and the journals $a\ a$ of the axle (which are still smaller in diameter than the bearing portions of the wheels) is cut a screw-thread on the axle, as seen at $i$, Fig. 1. On this screw-thread a nut, C, is screwed till it presses tightly against the wheel A, thus firmly holding the same on the axle. But the simple nut C is not sufficient to insure the permanent holding of the wheel in place, since it is liable to become unscrewed and work loose by the constant vibration of the wheels. I therefore make a key-socket, $g$, in the face of the nut C, and a corresponding notch in one side of the axle, and drive into the same a key, $d$, thereby securely preventing the nut from turning round and becoming unscrewed. Then, to prevent the possibility of the key $d$ ever coming out, I make a screw-thread in its inner end and insert a screw, $h$, therein down through one side of the nut $c$, substantially as seen at the right hand in Fig. 1. Thus the latter keeps the key from ever coming out; the key keeps the nut from turning off, and the nut holds the wheel in place. Therefore the most perfect security is attained, and this without any great degree of accuracy or tight fitting in the arrangement of the parts.

In order further to render the invention efficient under all circumstances, I provide for tightening up the nut $c$ as much as necessary at any time. This is effected by making six or more key-sockets, $g\ g$, in the nut, but only one notch in the axle, as shown in Fig. 2. Thus by taking out the key $d$ (which is readily done by driving against a projecting head, $f$, as shown,) and turning the nut round till the next key-socket, $g$, comes opposite to the notch in the axle, or any other socket, the key, then driven in, will hold the nut in the new position.

The key is flush with the face of the nut, and its head $f$ is flush with the face thereof; and to reach the key-head there is a space of the notch $g$ behind it. The nut generally has as many sides as there are sockets $g\ g$.

What I claim as my invention, and desire to secure by Letters Patent, is—

1. The arrangement of the nut C, key $d$, and screw $h$, in combination with the shouldered axle B, for securing the wheels A A on said axle, substantially as herein specified.

2. The series of key-sockets $g\ g$ in the nut C, in combination with the key-notch in the axle, for enabling the nut to be tightened up at any time, substantially as herein set forth.

R. S. TORREY.

Witnesses:
J. S. BROWN,
W. JAY KETCHAM.